United States Patent
Sambongi

(10) Patent No.: US 8,473,195 B2
(45) Date of Patent: Jun. 25, 2013

(54) POSITIONING DEVICE, POSITIONING METHOD AND STORAGE MEDIUM STORING PROGRAM

(75) Inventor: Masao Sambongi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 384 days.

(21) Appl. No.: 12/813,672

(22) Filed: Jun. 11, 2010

(65) Prior Publication Data

US 2010/0318289 A1    Dec. 16, 2010

(30) Foreign Application Priority Data

Jun. 16, 2009  (JP) .................................. 2009-143304
Nov. 17, 2009  (JP) .................................. 2009-261572

(51) Int. Cl.
*G01C 21/00* (2006.01)
*G01C 21/32* (2006.01)

(52) U.S. Cl.
CPC ...................................... *G01C 21/32* (2013.01)
USPC ........... 701/411; 701/412; 701/413; 701/518; 701/408; 701/410

(58) Field of Classification Search
CPC ....................................................... G01C 21/32
USPC .................. 701/201, 410, 408, 411–413, 518
See application file for complete search history.

(56) References Cited

U.S. PATENT DOCUMENTS

| | | | |
|---|---|---|---|
| 6,502,033 B1 * | 12/2002 | Phuyal ........................... | 701/445 |
| 6,581,005 B2 * | 6/2003 | Watanabe et al. ............. | 701/446 |
| 6,807,484 B2 * | 10/2004 | Inoue et al. .................... | 701/454 |
| 7,809,500 B2 * | 10/2010 | Couckuyt et al. ............. | 701/445 |
| 2005/0131635 A1 * | 6/2005 | Myllymaki et al. ........... | 701/205 |
| 2006/0122846 A1 * | 6/2006 | Burr et al. ........................ | 705/1 |
| 2009/0043495 A1 * | 2/2009 | Hattori et al. .................. | 701/208 |
| 2010/0241355 A1 * | 9/2010 | Park .............................. | 701/209 |

FOREIGN PATENT DOCUMENTS

| | | |
|---|---|---|
| JP | 11-230772 A | 8/1999 |
| JP | 2008-232771 A | 10/2008 |

* cited by examiner

*Primary Examiner* — Ryan Zeender
*Assistant Examiner* — Milena Racic
(74) *Attorney, Agent, or Firm* — Holtz, Holtz, Goodman & Chick, P.C.

(57) ABSTRACT

A positioning device for obtaining position data of a plurality of points on a movement route, including a positioning unit that can measure a present position; a movement measuring unit for measuring a relative positional change; a position calculating unit for calculating position data of the plurality of points on the movement route on the basis of position data of a first reference point and positional change data obtained through measurement of the movement measuring unit; and a correcting unit for correcting the position data of at least one of the plurality of points calculated by the position calculating unit on the basis of difference information representing difference between a position represented by the position data calculated by the position calculating unit and a position represented by a positioning result of the positioning unit with respect to any second reference point on the movement route.

14 Claims, 5 Drawing Sheets

FIG. 2

| MOVEMENT RECORD DATA | | | |
|---|---|---|---|
| No. | TIME DATA | POSITION DATA | CORRECTION FLAG |
| 1 |  :  :  | X : *, Y :*, Z : * | 1 |
| 2 |  :  :  | X : *, Y :*, Z : * | 1 |
| 3 |  :  :  | X : *, Y :*, Z : * | 1 |
| ⋮ | ⋮ | ⋮ | ⋮ |

POSITIONING DEVICE, POSITIONING METHOD AND STORAGE MEDIUM STORING PROGRAM

CROSS-REFERENCE TO RELATED APPLICATIONS

This application is based upon and claims the benefit of priority from the prior Japanese Patent Application No. 2009-143304, filed Jun. 16, 2009 and the prior Japanese Patent Application No. 2009-261572, filed Nov. 17, 2009, the entire contents of which are incorporated herein by reference.

BACKGROUND OF THE INVENTION

1. Field of the Invention

The present invention relates to a positioning device, a positioning method and a storage medium storing a program for determining position data of a plurality of points on a movement route.

2. Description of Related Art

A positioning device having an autonomous navigation function has been hitherto known. According to the autonomous navigation function, for example, after a reference point is measured by using a measuring unit which can measure an absolute position such as GPS (Global Positioning System), a moving direction and a moving amount are measured by using autonomous navigation sensors such as an acceleration sensor, an azimuth sensor, etc., and also displacement data obtained by the autonomous navigation sensors is being accumulatively added to the position data of the reference point, thereby calculating the position data of each point on a movement route.

Some correction techniques have been proposed for positioning devices having an autonomous navigation function (for example, JP-A-2008-232771, JP-A-11-230772). According to these correction techniques, when the calculation of position data based on the autonomous navigation function and the positioning based on GPS are simultaneously executed in the positioning device having the autonomous navigation function, the position data of that point is corrected on the basis of the positioning result of GPS and also measurement errors of the autonomous navigation sensors are corrected on the basis of the positioning result of GPS.

In general, when the calculation of the position data of the autonomous navigation function is continued, the error of the azimuth measurement and the error of the moving amount are accumulated, so that the error of the position data gradually increases. Particularly when the autonomous navigation function is added to a portable positioning device, a sensor for detecting an accurate speed such as a vehicle wheel speed sensor or the like cannot be provided, and thus the measurement error of the moving amount is also relatively larger.

However, the conventional technique in which GPS measurement is executed at a desired point while continuing the calculation of the position data based on the autonomous navigation function and the position data of the point which is subjected to GPS measurement is corrected has a problem that error accumulation increases in a section which is not subjected to GPS measurement, particularly at the rear end side of the section.

In the above correction technique, at each of points which are intermittently subjected to GPS measurement, errors which have been accumulated for the front stage of the point concerned is collectively corrected. Therefore, when a moving locus is represented by a series of position data, the difference in the position data between points before and after an error-corrected point is increased, and thus this correction technique has a problem that a continuous moving locus cannot be obtained.

SUMMARY OF THE INVENTION

An object of the present invention is to enhance the precision of position data of each finally-obtained point on a route for movement when positioning is executed on a plurality of points on the route for movement while both of calculation of position data based on an autonomous navigation function and measurement of an absolute position based on a positioning unit such as GPS or the like are used jointly.

In order to attain the above object, a positioning device for obtaining position data of a plurality of points on a movement route, comprising: a positioning unit that can measure a present position without requiring any past position data serving as a reference; a movement measuring unit for measuring a relative positional change; a position calculating unit for calculating position data of the plurality of points on the movement route on the basis of position data of a first reference point and positional change data obtained through measurement of the movement measuring unit; and a correcting unit for correcting the position data of at least one of the plurality of points calculated by the position calculating unit on the basis of difference information representing difference between a position represented by the position data calculated by the position calculating unit and a position represented by a positioning result of the positioning unit with respect to any second reference point on the movement route.

Furthermore, a positioning method for obtaining position data of a plurality of points on a movement route by using a positioning unit which can measure a present position and a movement measuring unit for measuring a relative positional change, comprising: a position calculating step of calculating position data of the plurality of points on the movement route on the basis of position data of a first reference point and positional change data obtained through measurement of the movement measuring unit; a difference information obtaining step of obtaining difference information representing difference between a position represented by the position data calculated in the position calculating step and a position represented by a positioning result of the positioning unit with respect to any second reference point on the movement route; and a correcting step of correcting the position data of at least one of the plurality of points calculated in the position calculating step on the basis of the difference information.

Furthermore, a storage medium storing a program readable by a computer that receives measurement results from a positioning unit for measuring a present position and a movement measuring unit for measuring a relative positional change and obtains position data of a plurality of points on a movement route, the storage medium storing a program making the computer execute: a position calculating function of calculating position data of the plurality of points on the movement route on the basis of position data of a first reference point and positional change data obtained through measurement of the movement measuring unit; a difference information obtaining function of obtaining difference information representing difference between a position represented by the position data calculated by the position calculating function and a position represented by a positioning result of the positioning unit with respect to any second reference point on the movement route; and a correcting function of correcting the position data of at least one of the plurality of points calculated by the position calculating function on the basis of the difference information.

BRIEF DESCRIPTION OF THE DRAWINGS

FIG. 2 is a data chart showing an example of movement record data;

DETAILED DESCRIPTION OF THE PREFERRED EMBODIMENTS

Preferred embodiments according to the present invention will be described with reference to the accompanying drawings.

First Embodiment

Figure 1:
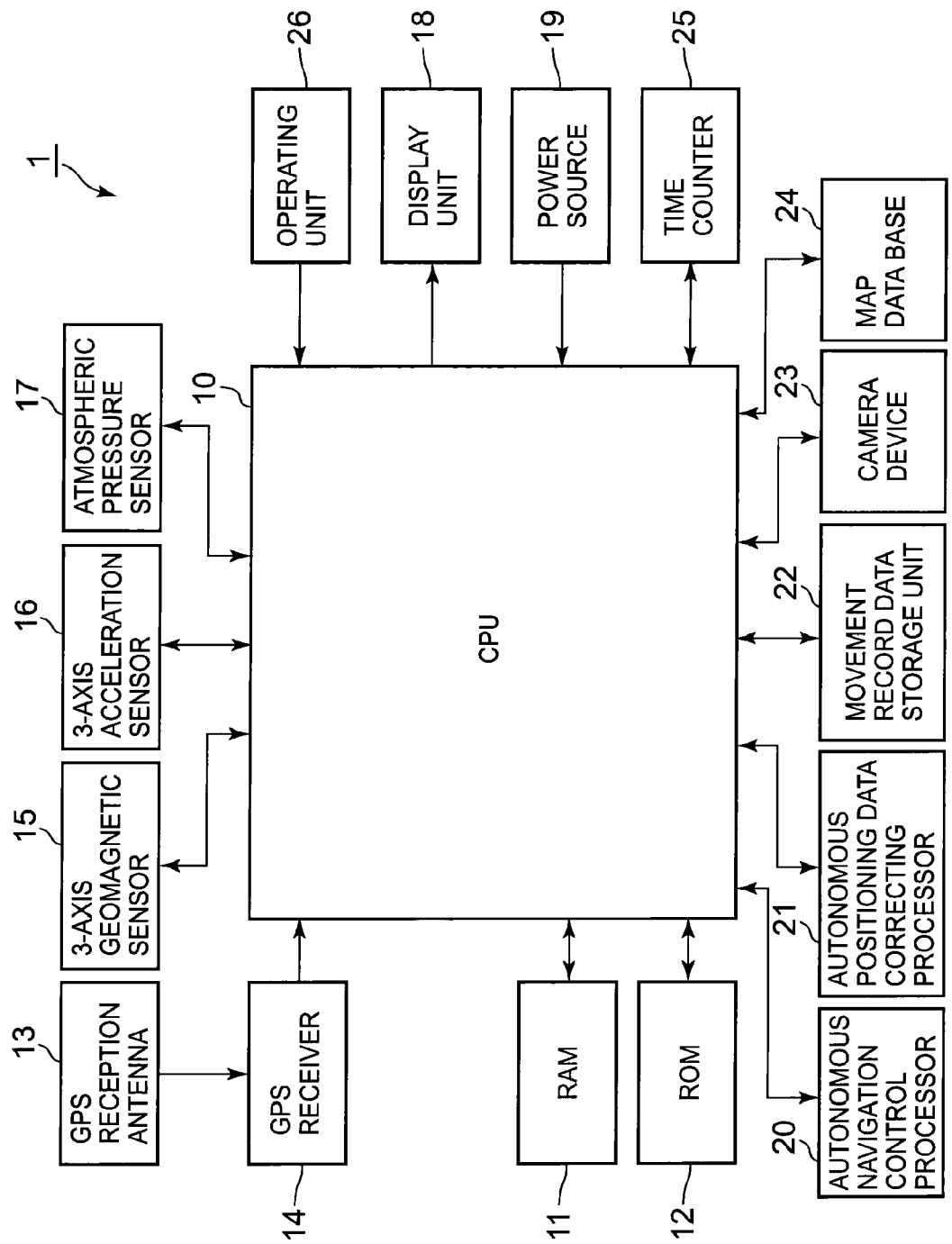
FIG. 1 is a block diagram showing the whole of a navigation device according to a first embodiment of the present invention.

FIG. 1 is a block diagram showing the whole of a navigation device 1 as a positioning device according to a first embodiment of the present invention.

The navigation device 1 of this embodiment accumulates position data of each point as movement record data while successively measuring a present position, and also when an image pickup operation is executed at some image pickup point during movement, the navigation device 1 can store image data obtained by the image pickup in association with position data of the image pickup point concerned.

As shown in FIG. 1, the navigation device 1 has CPU (central processing unit) 10 for performing the overall control of the navigation device 1, RAM 11 for supplying CPU 10 with a memory space for work, ROM 12 for storing a control program executed by CPU 10 and control data, a GPS reception antenna 13 and a GPS receiver 14 for receiving a signal transmitted from a GPS (Global Positioning System) satellite, autonomous navigation sensors (a three-axis geomagnetic sensor 15, a three-axis acceleration sensor 16, an atmospheric pressure sensor 17), a display unit 18 for performing various kinds of information display and image display, a power source 19 for supplying an operation voltage to each unit, an autonomous navigation control processor 20 for performing data processing and operation processing required for positioning using autonomous navigation sensors (15, 16, 17), an autonomous positioning data correcting processor 21 for performing a correcting calculation on position data obtained by the autonomous navigation control processor 20, a movement record data storage unit 22 for accumulating a series of position data along a route for movement, a camera device 23 for picking up an image, a map data base 24 in which map data are stored, a time counter 25 for counting a present time, an operating unit 26 for inputting an operation instruction from the external, etc.

The GPS receiver 14 executes demodulation signal, etc. on a signal received through the GPS reception antenna 13 on the basis of an operation instruction from CPU 10, and sends various kinds of transmission data of the GPS satellite to CPU 10. CPU 10 performs predetermined positioning calculation on the basis of the transmission data of the GPS satellite to obtain position data representing the present position.

The three-axis geomagnetic sensor 15 is a sensor for detecting the direction of terrestrial magnetism, and the three-axis acceleration sensor 16 is a sensor for detecting an acceleration in each of the three axial directions. The autonomous navigation control processor 20 receives through CPU 10 the detection data of the three-axis geomagnetic sensor 15 and the three-axis acceleration sensor 16 at a predetermined sampling period, and measures a moving direction and a moving amount of the navigation device 1 on the basis of these detection data.

The atmospheric sensor 17 is a sensor for detecting atmospheric pressure to determine a vertical interval (height difference) during movement of the navigation device 1 in a building, on a mountain or the like. The autonomous navigation control processor 20 reads out detection data of the atmospheric pressure sensor 17 together with detection data of the three-axis geomagnetic sensor 15 and the three-axis acceleration sensor 16, and it can also more accurately measure the movement amount in the height direction on the basis of these detection data.

The autonomous navigation control processor 20 handles specific calculation processing to assist the calculation processing of CPU 10. The autonomous navigation control processor 20 inputs the detection data of the autonomous navigation sensors (15, 16, 17) in response to an instruction of CPU 10 to calculate the moving direction and the moving amount of the navigation device 1, and also accumulates vector data comprising the thus-calculated moving direction and moving amount to position data of a reference position supplied from CPU 10, whereby the autonomous navigation control processor 20 calculates the position data of the present position and supplies the calculated position data to CPU 10.

The autonomous positioning data correcting processor 21 executes correcting calculation on one or a plurality of position data which are calculated by the autonomous navigation control processor 20 and stored in the movement record data storage unit 22 so that these position data are corrected to more accurate position data. The content of the correcting calculation will be described in detail later.

The camera device 23 has an image pickup device such as a CMOS (complementary metal-oxide semiconductor) sensor, CCD (Charge coupled device) or the like, and a lens for imaging an object, etc. According to an instruction of CPU 10, the camera device 23 converts an image of the object formed on the image pickup device to a digital signal and records the digital signal. The camera device 23 is provided with a large-capacity storage device (recording medium), and the image data obtained through the image pickup operation are stored in this storage device.

FIG. 2 is a data chart representing an example of movement record data stored in the movement record data storage unit 22.

The movement record data storage unit 22 is constructed by RAM, a non-volatile memory or the like, and movement record data as shown in FIG. 2 are recorded in the movement record data storage unit 22. The movement record data includes position data which are successively obtained and registered through the movement positioning processing during movement of the device. In association with a series of position data, an index number "No." representing the order of obtaining the position data, time data representing the time when each position data is obtained, a correction flag representing whether the position data has been corrected or not, etc. are also registered in the movement record data.

The movement record data storage unit 22 may be provided to a storage area as a part of RAM 11 or a storage area as a part of a storage device in which image data obtained by the camera device 23 are recorded.

In ROM 12 are stored a program for main control processing of operating the camera device 23 according to an operation input from the operating unit 26, switching the display content of the display unit 18 or controlling start/stop of movement positioning processing of recording a movement record, a program for movement positioning processing of continuously performing measurement of a present position and recording of position data to create movement record data, etc. These programs may be stored not only in ROM 12 as a storage medium, but also through a data reading device into a portable storage medium such as an optical disk or the like or a non-volatile memory such as a flash memory or the like which can be read out by CPU 10. These programs may be downloaded into the navigation device 1 through a communication line with carrier waves as a medium.

Acquisition of position data of the present position by using GPS positioning calculation of CPU 10 is referred to as GPS positioning, and acquisition of position data of the present position by using the autonomous navigation sensors (15, 16, 17) is referred to as autonomous positioning.

Next, the movement positioning processing executed by the thus-constructed navigation device 1 will be described.

Figure 3:
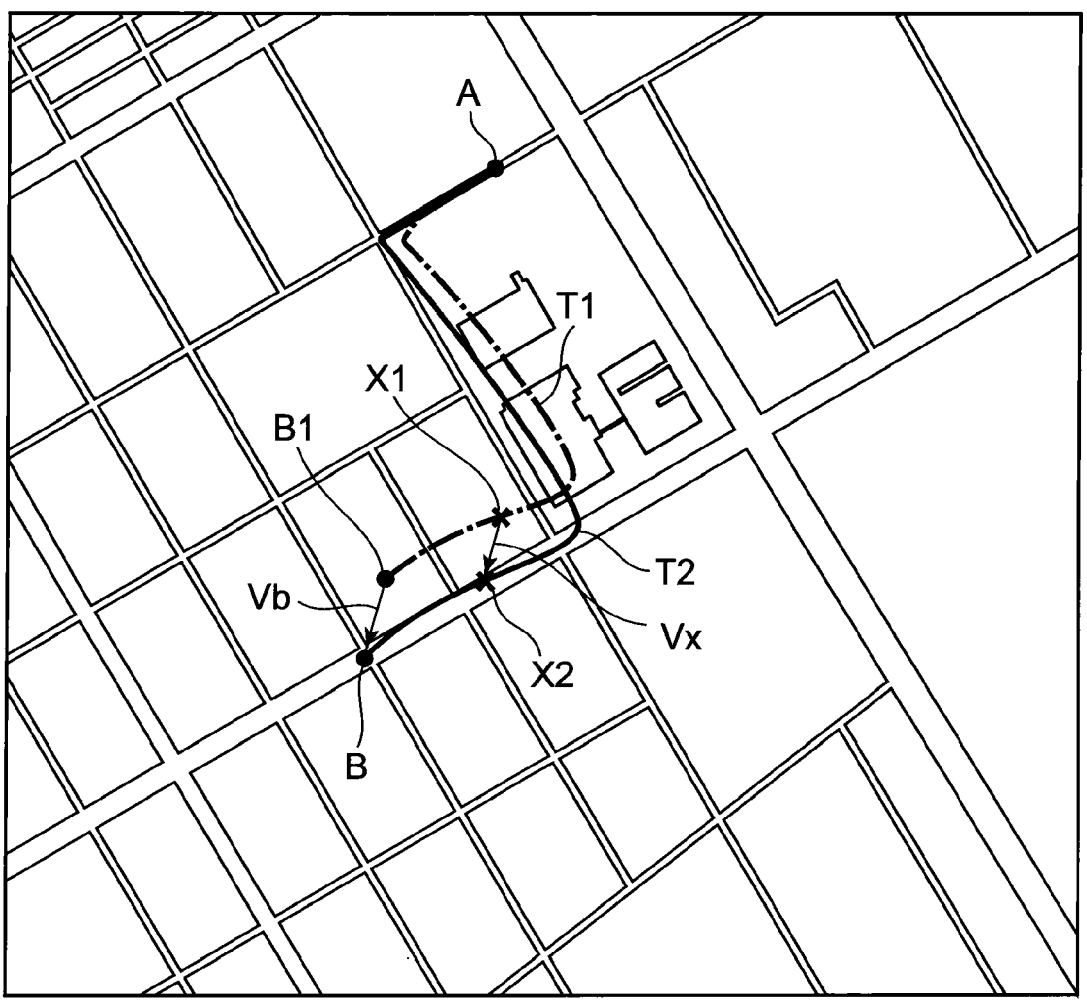
FIG. 3 is a diagram showing the comparison between a pre-correction movement locus T1 and a post-correction movement locus T2 generated in the navigation device according to the first embodiment.

FIG. 3 is a diagram showing the comparison between position data before correction and position data after correction in the navigation device 1 according to this embodiment. In FIG. 3, T1 represents a locus on a map corresponding to a series of position data before correction, and T2 represents a locus on a map corresponding to a series of position data after correction.

The movement positioning processing creates movement record data while continuously performs measurement of the present position and recording of the position data. In the movement positioning processing, autonomous positioning is continuously executed, and GPS positioning is intermittently executed, whereby position data of a plurality of points on a route for movement are being obtained. The position data which are intermittently obtained by the GPS positioning are used to provide position data of reference points required for the autonomous positioning and also to correct position data of other points calculated by the autonomous positioning.

FIG. 3 shows an example of the movement positioning processing executed while a user moves from a first reference point A to a second reference point B along a road and also the GPS positioning is intermittently executed twice at the first reference point A and the second reference point B. Specifically, the GPS positioning is first executed at the first reference point A as a start end of the route for movement, and then the autonomous positioning is continuously executed while the user who carries the navigation device 1 moves along the road to the second reference point B. A series of position data calculated by the autonomous positioning are accumulated as pre-correction data into the movement record data storage unit 22. The points corresponding to the series of position data are plotted on a map, thereby obtaining the locus T1. A relatively large error occurs in the autonomous positioning and also the error is continuously accumulated in the autonomous positioning. Therefore, the error of the locus T1 increases as the position approaches to the second reference point B.

When a predetermined time elapses in the movement positioning processing, next GPS positioning is executed. In the example of FIG. 3, the GPS positioning is executed at a timing at which the user passes over the second reference point B. The point B1 of the terminal end of the locus T1 corresponds to the position data obtained by the autonomous positioning at this time point.

Various conditions may be applied as the condition for executing GPS positioning intermittently. For example, the GPS positioning may be executed not only every lapse of a predetermined time, but also every movement of a predetermined interval, every time the navigation device 1 gets to a place which a radio wave of a GPS satellite reaches after the navigation device 1 enters a place which a radio wave does not reach, or the like.

When the GPS positioning is intermittently executed in the movement positioning processing, correction processing is first executed on the position data corresponding to the second reference point B out of the position data of the autonomous positioning recorded in the movement record data storage unit 22 on the basis of the position data obtained by the GPS positioning. That is, the position data based on the autonomous positioning which represents the point B1 is corrected to the position data based on the GPS positioning which represents the second reference point B. Furthermore, at this time, vector data as difference information representing the difference between both the position data is obtained by CPU 10. A vector Vb directing from the point B1 to the second reference point B is obtained by representing this vector data on the map.

When the data of the vector Vb is obtained, correction processing is executed on a series of position data (the position data of the locus T1) obtained from the first reference point A to the second reference B by the autonomous positioning. For example, the position data of a point X1 during movement will be described.

The position data corresponding to the point X1 is corrected to position data representing a point X2 by the following arithmetic expression (1).

$$X2 = X1 + (Lx/L0) \times Vb \qquad (1)$$

Here, X1 and X2 represent the position data before and after correction (i.e., pre-correction position data and post-correction position data) respectively, and the same symbols (X1, X2) representing the points are used. L0 represents the movement locus length of the path traveled by the user from the first reference point A to the second reference point B as measured by the autonomous measurement, and this path is plotted as locus T1. As described above, the locus T1 includes an error which occurs due to the autonomous positioning when the user moves from the first reference point A to the second reference point B. Lx represents the movement locus length along the locus T1 from the first reference point A to the correction target point X1. The locus lengths L0, Lx may be calculated by accumulating the movement amount under the autonomous positioning, and stored in association with each position data. Alternatively, when the respective position data along the movement route are obtained at a relatively minute interval, the difference amount between each position data and position data before or after the position data concerned may be accumulated from the series of position data in the correcting calculation.

The correcting calculation as described above is executed on each of the series of position data representing the locus T1 which is obtained from the first reference point A to the second reference point B by the autonomous positioning, whereby the corrected position data from the first reference point A to the second reference point B are obtained. In FIG. 3, the points corresponding to the corrected position data are plotted on the map to obtain the locus T2. As compared with the locus T1 before the correction, the locus T2 is closer to an actual movement route when the navigation device moves along roads.

When the corrected position data are obtained, for example, the corrected position data are overwritten on the position data before the correction in the movement record data storage unit 22, and also a correction flag corresponding to this overwritten position data is updated to "1" which represents completion of correction.

Furthermore, when the user moves and the movement positioning processing as described above is continued, the reference point is displaced one by one, and the first reference point is re-defined as the point B while a point at which GPS positioning is next executed is re-defined as the second reference point. The autonomous positioning and the correction processing are likewise repeated as described above. Through the processing described above, a series of position data which are measured and corrected along the movement route are successively accumulated in the movement record data storage unit 22. The finally-obtained series of position data become a series of position data which have no great displacement between positions before and after each reference position at which the GPS positioning is intermittently executed, and represent a continuous and natural locus. Furthermore, any position data has excellent precision on average.

When the user picks up an image by using the camera device 23 during movement, the image data based on the pickup image concerned and the corrected position data are stored in the storage device in association with each other.

The content of the correcting calculation of the position data is not limited to the above example. For example, the following arithmetic expression (2) may be adopted.

$$X2=X1+(\Delta tx/\Delta t0) \times Vb \quad (2)$$

Here, X2, X1 represents the position data representing the points X2, X1, $\Delta t0$ represents a time length which is taken to move from the first reference point A till the point B, and $\Delta tx$ represents a time length which is taken to move from the first reference point A till the point X2.

According to the correction processing as described above, when the measurement error is successively accumulated with time lapse, this error can be effectively corrected.

Furthermore, the following arithmetic expression (3) may be adopted as an arithmetic expression for the correction processing of the position data.

$$X2=X1+g1(Lx/L0) \times Vb + g2(\Delta tx/\Delta t0) \times Vb \quad (3)$$

Here, X2, X1, L0, Lx, $\Delta t0$, $\Delta tx$ represent the variables shown in the arithmetic expressions (1) and (2), and g1 and g2 represent weighting coefficients under the condition (g1+g2=1).

According to the correction processing as described above, when a measurement error dependent on time lapse and a measurement error dependent on a moving distance are successively accumulated in position data, these errors can be effectively corrected.

Furthermore, as indicated by the following arithmetic expressions (4) and (5), the correcting term described above may be used in combination with another correcting term.

$$X2=X1+g1(Lx/L0) \times Vb + g2(\Delta tx/\Delta t0) \times Vb + g3 \text{(another correcting term)} \quad (4)$$

Here, g1 to g3 represent weighting coefficients, and for example, they are set so that the position data after the corrected position data of the second reference point B has the same value as the position data of the GPS positioning.

$$X2=f1(f2(x1)) \quad (5)$$

Here, $f1(x)$ represents a first correction function with respect to position data x, $f2(x)$ represents a second correction function with respect to position data x, the function of the arithmetic expressions (1) to (4) is adopted for one of the correction functions $f1(x)$ and $f2(x)$, and another correction function is adopted for the other of the correction functions $f1(x)$ and $f2(x)$.

According to the correction processing using the arithmetic expressions (4) and (5) as described above, more accurate position data can be obtained by executing correction processing which is combined with calculation of another useful correction term.

The movement positioning processing described above will be described in detail with reference to the flowchart.

Figure 4:
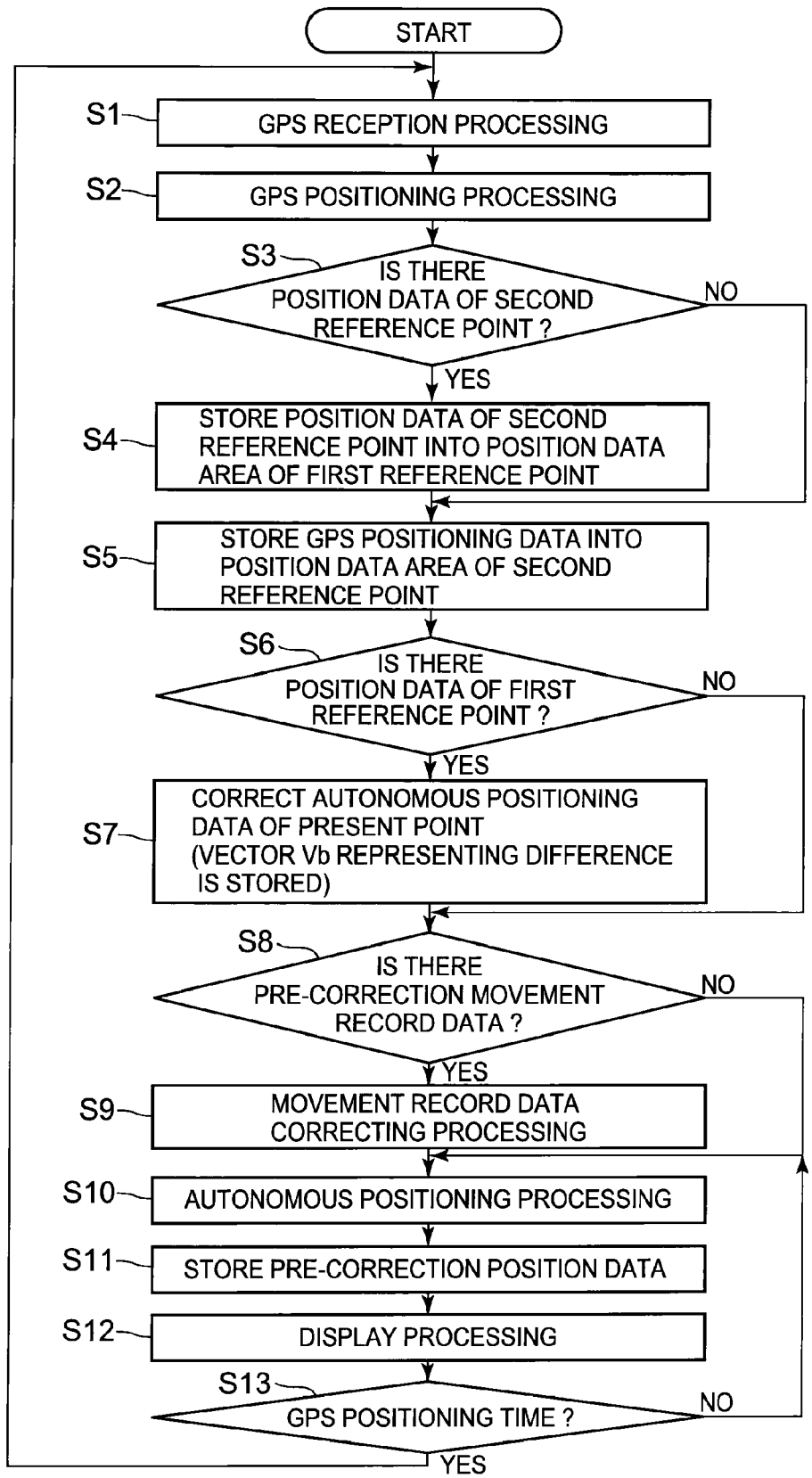
FIG. 4 is a flowchart showing a processing procedure of movement positioning processing executed by CPU.

FIG. 4 is a flowchart showing the processing flow of the movement positioning processing executed by CPU 10.

This movement positioning processing is started when an instruction of starting the movement positioning processing is input from the external through the operating unit 26, for example. When the movement positioning processing is started, CPU 10 first actuates the GPS receiver 14 to executes reception processing of a signal from the GPS satellite (step S1). Subsequently, CPU 10 executes positioning calculation on the basis of transmission data of the GPS satellite to obtain position data of a reference point (step S2).

When the position data of the reference point is determined, CPU 10 determines whether position data is stored in the position data area of the second reference point which is set on RAM 11 (step S3). When there is position data in the position data area, the position data of the second reference point is stored in the position data area of the first reference point set on RAM 11 (step S4), and the processing shifts to the next step S5. On the other hand, when no position data is stored in the position data area of the second reference point, the processing directly jumps to step S5.

In step S5, the position data of the GPS positioning calculated in step S2 is stored in the position data area of the second reference point set on RAM 11.

The processing of the steps S3 to S5 is the processing of displacing the position data of the reference position one by one every time the GPS positioning is intermittently executed, setting the position data based on the just-before executed GPS positioning operation as the position data of the first reference position, and setting the position data based on the presently-executed GPS positioning operation as the position data of the second reference position.

When the position data of the GPS positioning is stored, CPU 10 determines whether position data is stored in the position data area of the first reference point set on RAM 11 (step S6). This step S6 is the processing of determining whether only the first GPS positioning has been executed just after the movement positioning processing is started or second or subsequent GPS positioning has been executed.

As a result, when there is no position data of the first reference point, it can be determined that only the first GPS positioning has been executed, and thus the processing directly shifts to the step S8. On the other hand, when there is position data of the first reference point, it can be determined that the second or subsequent GPS positioning has been executed. Accordingly, the position data stored in the movement record data storage unit 22 (the position data which is measured and stored just before in the steps S10, S11) as the position data of the present point is corrected to the position data of the GPS positioning result. In the correction processing, the correction flag is updated to the correction-completed value. At the same time, the data of the vector Vb representing the difference between these position data is calculated, and stored on RAM 11 (step S7). Then, the processing shifts to step S8.

In step S8, CPU 10 determines whether position data before correction exists in a series of position data recorded in the movement record data storage unit 22, that is, there is position data whose correction flag value is equal to the value of "0" indicating "before correction".

The determination processing of the step S8 is to determine whether the present state is a state under which only the first GPS positioning has been executed because the movement positioning processing is just started or a state under which the second or subsequent GPS positioning has been executed, but the autonomous positioning is not executed between intermittent GPS positioning operations because the navigation device 1 does not move. When the second or subsequent GPS positioning has been executed and also the autonomous positioning is also executed between intermittent GPS positioning operations, it is determined in the determination processing of the step S8 that there is position data before correction (pre-correction position data).

When it is determined in the determination processing of the step S8 that there is pre-correction position data, CPU 10 issues an instruction to the autonomous positioning data correcting processor 21, and executes the correction calculation of the mathematical expression (1) on all the pre-correction position data registered in the movement record data (step S9: correcting step). On the other hand, when there is no pre-correction position data, the processing directly shifts to step S10.

When the processing shifts to the step S10, CPU 10 repetitively executes the autonomous positioning processing by the loop processing of the steps S10 to S13. That is, CPU 10 sends the detection data of the autonomous navigation sensors (15, 16, 17) to the autonomous navigation control processor 20 to execute the calculation processing based on the autonomous positioning (step S10: position calculating step). CPU registers the calculated position data into the movement record data of the storage unit 22 together with time data and correction flag information (step S11). When the navigation device 1 does not move by a fixed distance or more, registration of the calculated position data into the movement record data may be omitted.

When the position data is obtained from the autonomous navigation control processor 20, data for displaying the points corresponding to position data and a movement locus on a map are output to the display unit 18 (step S12), and then it is determined whether the present time reaches a next GPS positioning time or not (step S13). When the present time does not reach the next GPS positioning time, the processing returns to step S10 to repeat the loop processing of the steps S10 to S13. On the other hand, when the present time reaches the next GPS positioning time, the processing gets out of the processing loop of the steps S10 to S13 and returns to the step S1.

According to the movement positioning processing as described above, the autonomous positioning processing is continuously executed by the loop processing of the steps S10 to S13, and also the GPS positioning is intermittently executed by the processing of the steps S1 and S2. Furthermore, when the GPS positioning is executed, the position data obtained by the autonomous positioning are corrected by the correcting calculation described above, and the corrected position data are successively accumulated in the movement record data storage unit 22 through the processing of the steps S8 and S9.

As described above, according to the navigation device 1, the positioning method for the navigation device 1 and the program for the movement positioning processing for the navigation device 1 of this embodiment, the position data of the other points on the movement route besides the reference point are corrected on the basis of the vector data (Vb) representing the difference between the position data based on the GPS positioning and the autonomous positioning at the second reference point. Therefore, relatively accurate position data can be also obtained with respect to the other points on which the GPS positioning is not executed and only the autonomous positioning is executed.

In the correcting calculation of the position data, the vector data (Vb) multiplied by a small rate coefficient is added to the position data of a point which is near to the first reference point, and the vector data (Vb) multiplied by a larger rate coefficient is added to the position data of a point as the point is farther away from the first reference point along the movement route. Therefore, the position data of the autonomous positioning in which errors are successively accumulated can be properly corrected. Furthermore, continuity of a series of position data is kept, and thus even when correction of position data is executed at a relatively long time interval by GPS positioning, a continuous and natural movement locus can be obtained by a series of position data.

Furthermore, according to the correcting calculation of the arithmetic expression (1) in which the vector data (Vb) is multiplied by a coefficient which is substantially proportional to the moving distance and then added to the position data before correction, when the error of the autonomous positioning increases in accordance with the moving distance, this error can be effectively corrected. Furthermore, according to the correcting calculation of the arithmetic expression (2) in which the vector data (Vb) is multiplied by a coefficient which is substantially proportional to the movement time and then added to the position data before correction, when the error of the autonomous positioning increases with time lapse, this error can be effectively corrected. According to the arithmetic expression (3) obtained by properly weighting and combining these arithmetic expressions, the error of the autonomous positioning in which both the errors occur can be effectively corrected. Furthermore, by executing the above correcting calculation with proper weighting, correcting processing combined with another effective correcting term can be implemented.

Through the correction processing as described above, the autonomous positioning is continuously executed and the GPS positioning is intermittently executed to correct position data between the intermittent GPS positioning operations, whereby a series of relatively accurate position data are obtained. Accordingly, the frequency of the GPS positioning operation which requires large power consumption can be reduced, and thus the total power consumption of the movement positioning processing can be greatly reduced.

Second Embodiment

A navigation device according to a second embodiment is different from the first embodiment in only the method of correcting the position data obtained by the autonomous positioning, and the construction of the device, the method of obtaining the position data in the movement positioning processing, etc. of the second embodiment are substantially identical to those of the first embodiment. Accordingly, only the different portion will be described in detail.

Figure 5:
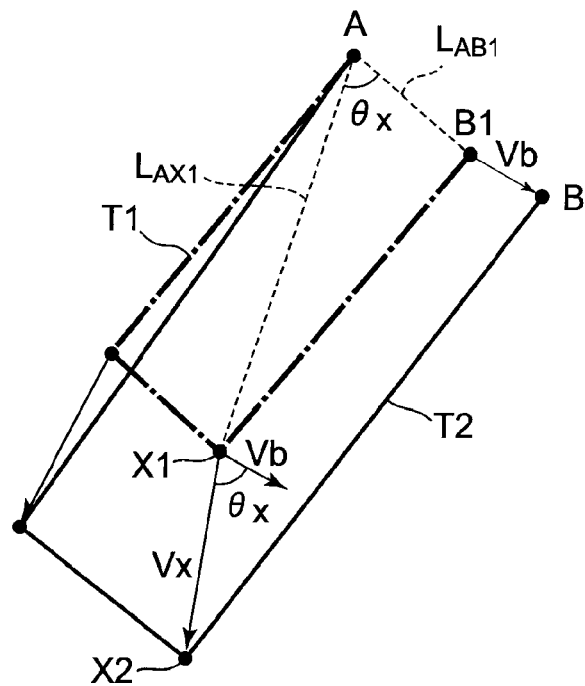
FIG. 5 is a diagram showing a method of correcting position data in a navigation device according to a second embodiment of the present invention.

FIG. 5 is a diagram showing a method of correcting the position data in the navigation device according to the second embodiment of the present invention. In an example of FIG. 5, a user moves along an U-shaped movement route from a first reference point A to a second reference point B, position data of a locus T1 are obtained by autonomous positioning, and GPS positioning is executed at the terminal point of the movement route to obtain position data of the second reference point B.

According to the correcting method of this embodiment, when an error occurs at a fixed rate in the measurement value of the movement amount obtained by the autonomous positioning at all times, the error concerned can be effectively removed. For example, this embodiment is useful in a case where a system for measuring a movement amount of a walking object on the basis of the step number (the number of steps) and the stride of a walking object is adopted under autonomous positioning.

The following system is generally applied as a method of measuring the movement amount of a walking object under autonomous positioning. That is, a user registers the stride of a walking object as stride data in the navigation device in advance. When autonomous positioning is executed, the autonomous navigation control processor 20 detects the vertical motion of the walking object by the three-axis accelerator sensor 16, calculates the step number of the walking object on the basis of the detected vertical motion, and multiplies the calculated step number by the stride data, thereby determining the movement amount of the walking object. In the measuring system as described above, when the stride data set by the user in advance has some deviation from the actual stride, a uniform error occurs in the measurement value of the movement amount based on the autonomous positioning at all times.

In the navigation device of the second embodiment, the following correction processing is executed on the position data obtained by autonomous positioning. That is, it is assumed that a user moves from the first reference point A and position data of respective points along the locus T1 are obtained by the autonomous positioning as shown in FIG. 5. Furthermore, it is assumed that GPS positioning is executed at the terminal point B1 and position data of the second reference point B is obtained. In this case, the autonomous positioning data correcting processor 21 of the navigation device first corrects the position data of the terminal point B1 on the basis of the position data of the second reference point B obtained by the GPS positioning. Furthermore, a vector Vb as difference information between the position data of the terminal point B1 and the position data of the second reference point B is determined.

When this vector Vb is determined, the position data of the respective points of the locus T1 obtained by the autonomous positioning are corrected by the following arithmetic expression (6).

$$X2 = X1 + Vx$$

$$|Vx| = |Vb| \times (L_{AX1}/L_{AB1})$$

$$\text{Direction of } Vx = (\text{Direction of } Vb) + \theta x \quad (6)$$

Here, X1 represents the position data of a correction target point on the locus T1, X2 represents position data after correction, Vx represents a displacement vector at the correction target point, $L_{AB1}$ represents the length of a line segment A-B1, $L_{AX1}$ represents the length of a line segment A-X1, and θx represents an intersecting angle between the line segment A-B1 and the line segment A-X1.

The position data at the point X1 in FIG. 5 will be described in detail. In this case, the magnitude of the vector Vb representing the difference amount of the second reference point B is increased or reduced at the rate ($L_{AX1}/L_{AB1}$) corresponding to the distance of the straight line ($L_{AX1}$) from the first reference point A to the point X1. The direction of the vector Vb is varied by only the displacement angle θx from the point B1 to the point X1 around the first reference point A, whereby a displacement vector Vx corresponding to the point X1 is determined. This displacement vector Vx is added to the position data of the point X1 to calculate the position data of the point X2 after correction.

The autonomous positioning data correcting processor 21 of the navigation device executes the correcting calculation as described above on all the position data of the locus T1 obtained by the autonomous positioning, thereby obtaining the position data of the corrected locus T2.

According to the correcting method of the second embodiment, when the error of the position data obtained by the autonomous positioning is not random, an error is contained in the measurement value of the movement amount at a fixed rate at all times and also a fixed offset error is contained in the measurement value of the azimuth at all times, these errors can be accurately removed. For example, there is considered such a situation that the navigation device is moved along the locus T2 and the autonomous positioning is executed during the movement under a condition that an error of "−30%" is uniformly contained in the measurement value of the movement amount and offset is contained an angle of three degrees in the measurement value of the azimuth. In this case, it can be surely verified that the position data of the locus T1 can be obtained by the autonomous positioning. Therefore, it is found that the error of the autonomous positioning as described above can be effectively removed by the correcting method according to the second embodiment.

Third Embodiment

A navigation device according to a third embodiment is different form the first and second embodiments in only the method of correcting the position data obtained by autonomous positioning, and the construction of the device, the method of obtaining the position data in the movement positioning processing, etc. of the third embodiment are substantially identical to those of the first and second embodiments. Accordingly, only the different portion will be described in detail.

According to the position data correcting method of the third embodiment, when an error occurs at a fixed rate in the measurement value of the movement amount at all times under autonomous positioning and also a fixed direction error is successively accumulated in the measurement value of the moving direction in connection with the movement, these errors can be effectively removed.

Figure 6:
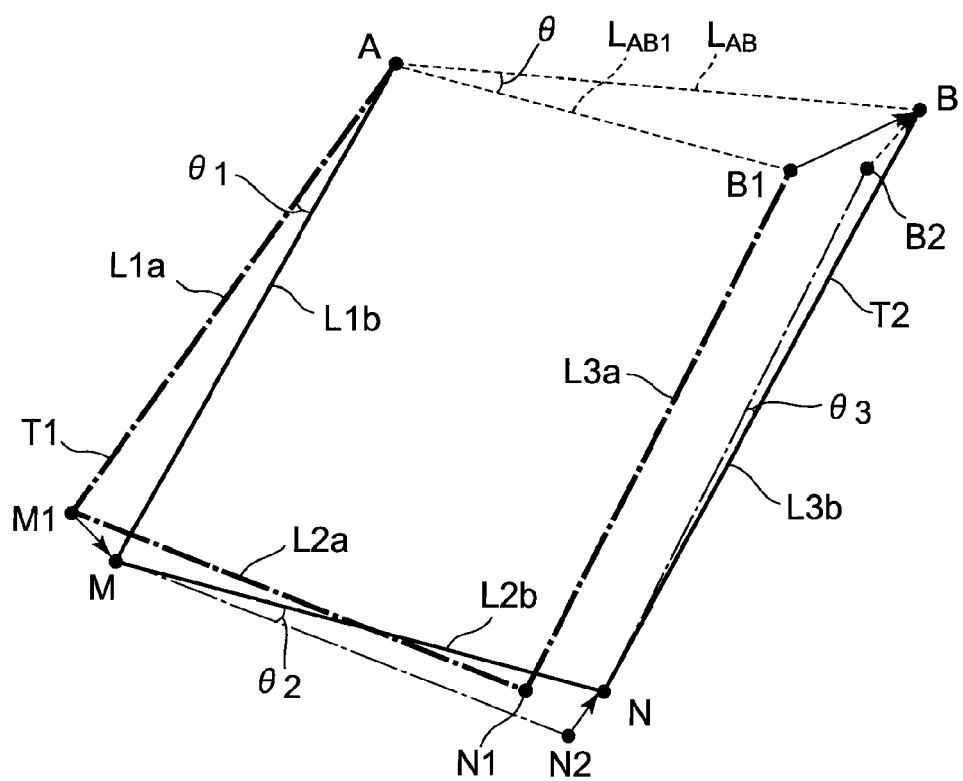
FIG. 6 is a diagram showing a method of correcting position data in a navigation device according to a third embodiment of the present invention.

FIG. 6 is a diagram showing a method of correcting the position data in the navigation device according to the third embodiment of the present invention. In an example of FIG. 6, a user moves along a U-shaped movement route from a first reference point A to a second reference point B, position data of a locus T1 (indicated by a one-dotted heavy chain line) are obtained by autonomous positioning, and GPS positioning is executed at a terminal point of the movement route to obtain position data of a second reference point B.

In FIG. 6, M1, N1, B1 represent points represented by position data obtained by the autonomous positioning, and M, N, B represent points represented by corrected position data. Each of θ, θ1 to θ3 represents the angle between two lines, and each of $L_{AB}$, $L_{AB1}$, L1a to L3a, L1b to L3b represents the length of the corresponding line segment.

In the third embodiment, when the position data of the points A, M1, N1, B1 and B are obtained by autonomous positioning and GPS positioning, the autonomous positioning data correcting processor 21 first calculates the multiplying power ($L_{AB}/L_{AB1}$) between the length $L_{AB1}$ from the first reference point A to the terminal point B1 based on the autonomous positioning and the length $L_{AB}$ from the first reference point A to the second reference point B. Furthermore, the autonomous positioning data correcting processor 21 calculates the rotational angle θ from the point B1 to the point B around the first reference point A.

Subsequently, by using these calculated values, the autonomous positioning data correcting processor 21 executes the correction processing on the position data of a series of points M1, N1, B1 which are obtained by the autonomous positioning. That is, on the assumption that a fixed rate of error occurs in the movement amount measured under the autonomous positioning by only the amount corresponding to the above multiplying power ($L_{AB}/L_{AB1}$), the lengths of the respective line segments after correction (post-correction lengths) are calculated by the following arithmetic expressions (7) to (9).

$$L1b = L1a \times (L_{AB}/L_{AB1}) \quad (7)$$

$$L2b = L2a \times (L_{AB}/L_{AB1}) \quad (8)$$

$$L3b = L3a \times (L_{AB}/L_{AB1}) \quad (9)$$

Furthermore, on the assumption that a fixed error is accumulated in the measurement value of the moving direction during the movement and the error of the final moving direction has an angle θ, the autonomous positioning data correcting processor 21 calculates the error angles θ1 to θ3 of the respective moving directions measured by the autonomous positioning according to the following arithmetic expressions (10) to (12).

$$\theta1 = \theta \times \{L1a/(L1a+L2a+L3a)\} \quad (10)$$

$$\theta2 = \theta \times \{L2a/(L1a+L2a+L3a)\} \quad (11)$$

$$\theta3 = \theta \times \{L3a/(L1a+L2a+L3a)\} \quad (12)$$

The position data of the respective points M1, N1, B1 obtained by the autonomous positioning are successively corrected by using the post-correction lengths L1b to L3b of the respective lines and the error angles θ1 to θ3 thus obtained.

That is, the line segment A-M1 from the first reference point A to the point M1 as the next autonomous positioning point is rotated around the first reference point A by only the error angle θ1, and further the length of this line segment L1a is increased/reduced to the post-correction length L1b to create the line segment A-M. The position data of the point M as an end point of the post-correction line segment A-M is set as corrected position data for the point M1.

With respect to the position data of the point N1 which is obtained by the second autonomous positioning operation, the start end of the line segment as a processing target is displaced by the just-previous correction processing, and thus the processing for this displacement is executed. That is, the line segment M1-N1 representing the movement amount and the moving direction measured by the second autonomous positioning operation is translated parallel so that the post-correction point M becomes a starting end, thereby obtaining a new line segment M-N2 (indicated by a one-dotted thin chain line in FIG. 6).

The processing of removing the uniform error added in the autonomous positioning is executed on this line segment M-N2. That is, the line segment M-N2 is rotated around the point M by only the error angle θ2, and the length L2a of this line segment is increased/reduced to the post-correction length L2b to create a line segment M-N. The position data of the point N as an end point of the post-correction line segment M-N is set as corrected position data for the point N1.

Subsequently, the same processing is executed on the position data of the point B1 which is obtained by the third autonomous positioning operation to obtain corrected position data which is substantially overlapped with the second reference point B.

The autonomous positioning data correcting processor 21 of the navigation device executes the correcting calculation as described above, whereby the position data of the respective points A, M, N, B along the locus T2 of FIG. 6 can be obtained. In the example of FIG. 6, only the position data of the three points M1, N1, B1 are obtained by the autonomous positioning while the user moves from the first reference point A till the second reference point B. However, even when position data of many points are obtained by the autonomous positioning while the user moves from the first reference point A till the second reference point B, the autonomous positioning data correcting processor 21 repeats the same correction processing from a point at the first reference point A side, whereby the corrected position data at each point can be obtained.

According to the correcting method of the third embodiment, when the error of the position data obtained by the autonomous positioning is not random, an error is contained in the measurement value of the movement amount at a fixed rate at all times and also a fixed direction error is successively accumulated in the measurement value of the azimuth in proportion to the movement amount, these errors can be accurately removed.

The present invention is not limited to the first to third embodiments, and various modifications may be made. For example, in the above embodiments, the calculation of the autonomous positioning and the calculation of the correcting processing are executed by the autonomous navigation control processor 20 and the autonomous positioning data correcting processor 21. However, these calculations may be implemented by the software processing of CPU 10.

Furthermore, in the movement positioning processing of the first to third embodiments, the GPS positioning and the correcting processing based on the GPS positioning are intermittently repeated. However, the GPS positioning operation may be executed at only the last time or only the first and last two times in one movement positioning processing, and the position data obtained by the autonomous positioning during the movement positioning processing concerned may be corrected on the basis of the last GPS positioning result. In the movement positioning processing of the above embodiments, the position data of a point between the first and second reference points is corrected on the basis of the vector Vb of the second reference point. For example, position data on a movement route which extends over the second reference point can be corrected on the basis of the vector Vb through the same arithmetic expression.

In the movement positioning processing of the first to third embodiments, the position data of the first reference point as the start point of the movement is obtained by GPS positioning. However, for example when a moving start point is known or the like, the position data of the first reference point may be provided to the device through an external input or the like.

In the first to third embodiments, the construction of positioning by using GPS is adopted as the positioning unit. However, various other constructions such as a construction of positioning through communications with a base station of a cellular phone, a construction of inputting position data from the external to obtain positioning information, etc. may be adopted. Furthermore, the three-axis geomagnetic sensor, the three-axis acceleration sensor and the atmospheric pressure sensor are used as the movement measuring units for measuring the relative positional change. However, when only position data of two-dimensional directions are required to be obtained, the atmospheric pressure may be omitted. Furthermore, when the vertical direction of the device is fixed, a two-axis azimuth sensor or a two-axis acceleration sensor may be used.

In the first to third embodiments, the present invention is applied to the portable navigation device 1. However, the present invention may be applied to a positioning device which is installed in a mobile object. Furthermore, various modifications may be made to the specific content of the movement record data, and the image pickup function of the camera device 23, the map display and movement locus display function, etc. are not indispensable. The details, etc. which are specifically described with respect to the embodiments may be properly modified without departing from the subject matter of the present invention.

What is claimed is:

1. A positioning device for obtaining position data of a plurality of points on a movement route, comprising:
    a positioning unit that can measure a present position without requiring any past position data serving as a reference;
    a movement measuring unit for measuring a relative positional change;
    a position calculating unit for calculating position data of the plurality of points on the movement route based on position data of a first reference point and positional change data obtained through measurement of the movement measuring unit; and
    a correcting unit for correcting the position data of at least one of the plurality of points calculated by the position calculating unit based on difference information representing a difference between a position represented by the position data calculated by the position calculating unit and a position represented by a positioning result of the positioning unit with respect to any second reference point on the movement route;
    wherein the correcting unit executes a correcting calculation containing a correcting term based on a total route length measured by the movement measuring unit from the first reference point to the second reference point, a first route length measured by the movement measuring unit from the first reference point to a point at which position data of a correction target is obtained, and the difference information at the second reference point; and
    wherein a ratio of the first route length to the total route length is set as a coefficient, a displacement amount represented by the difference information is multiplied by the coefficient, and a product of the displacement amount and the coefficient is added to the position data of the correction target.

2. The positioning device according to claim 1, wherein the correcting unit subjects the displacement amount obtained by the multiplication to predetermined weighting, and adds the weighted displacement amount to the position data of the correction target.

3. A positioning device for obtaining position data of a plurality of points on a movement route, comprising:
    a positioning unit that can measure a present position without requiring any past position data serving as a reference;
    a movement measuring unit for measuring a relative positional change;
    a position calculating unit for calculating position data of the plurality of points on the movement route based on position data of a first reference point and positional change data obtained through measurement of the movement measuring unit; and
    a correcting unit for correcting the position data of at least one of the plurality of points calculated by the position calculating unit based on difference information representing a difference between a position represented by the position data calculated by the position calculating unit and a position represented by a positioning result of the positioning unit with respect to any second reference point on the movement route;
    wherein the correcting unit executes a correcting calculation containing a correcting term based on a total time length taken to move from the first reference point to the second reference point, a first time length taken to move from the first reference point to a point at which position data of a correction target is obtained, and the difference information at the second reference point; and
    wherein a ratio of the first time length to the total time length is set as a coefficient, a displacement amount represented by the difference information is multiplied by the coefficient, and a product of the displacement amount and the coefficient is added to the position data of the correction target.

4. The positioning device according to claim 3, wherein the correcting unit subjects the displacement amount obtained by the multiplication to predetermined weighting, and adds the weighted displacement amount to the position data of the correction target.

5. The positioning device according to claim 1, wherein the difference information contains information of a distance and a direction between two points represented by two position data.

6. The positioning device according to claim 1, further comprising a storage unit for storing movement record data containing the position data of the plurality of points calculated by the position calculating unit, wherein the correcting unit corrects the position data of the plurality of points contained in the movement record data.

7. The positioning device according to claim 1, wherein measurement of the movement measuring unit and calculation of the position data by the position calculating unit are continuously performed while measurement of the present position by the positioning unit is intermittently performed, and the correcting unit sets two points at which position data is intermittently measured by the positioning unit as the first and the second reference points, and corrects the position data calculated by the position calculating unit.

8. A positioning method for a positioning device comprising a CPU, a positioning unit for measuring a present position, and a movement measuring unit for measuring a relative positional change, the positioning device obtaining position data of a plurality of points on a movement route by using the positioning unit and the movement measuring unit, the method comprising:
    calculating position data of the plurality of points on the movement route based on position data of a first reference point and positional change data obtained through measurement of the movement measuring unit;

obtaining difference information representing a difference between a position represented by the calculated position data and a position represented by a positioning result of the positioning unit with respect to any second reference point on the movement route; and correcting the calculated position data of at least one of the plurality of points based on the obtained difference information;

wherein the correcting comprises executing a correcting calculation containing a correcting term based on a total route length measured by the movement measuring unit from the first reference point to the second reference point, a first route length measured by the movement measuring unit from the first reference point to a point at which position data of a correction target is obtained, and the difference information at the second reference point;

wherein a ratio of the first route length to the total route length is set as a coefficient, a displacement amount represented by the difference information is multiplied by the coefficient, and a product of the displacement amount and the coefficient is added to the position data of the correction target; and wherein the calculating, the obtaining, and the correcting are performed by the CPU of the positioning device.

9. A non-transitory computer readable storage medium having a program stored thereon which is executable by a computer that receives measurement results from a positioning unit for measuring a present position and a movement measuring unit for measuring a relative positional change and that obtains position data of a plurality of points on a movement route, the program controlling the computer to execute functions comprising:

calculating position data of the plurality of points on the movement route based on position data of a first reference point and positional change data obtained through measurement of the movement measuring unit;

obtaining difference information representing a difference between a position represented by the calculated position data and a position represented by a positioning result of the positioning unit with respect to any second reference point on the movement route; and correcting the calculated position data of at least one of the plurality of points based on the obtained difference information;

wherein the correcting comprises executing a correcting calculation containing a correcting term based on a total route length measured by the movement measuring unit from the first reference point to the second reference point, a first route length measured by the movement measuring unit from the first reference point to a point at which position data of a correction target is obtained, and the difference information at the second reference point; and wherein a ratio of the first route length to the total route length is set as a coefficient, a displacement amount represented by the difference information is multiplied by the coefficient, and a product of the displacement amount and the coefficient is added to the position data of the correction target.

10. A positioning method for a positioning device comprising a CPU, a positioning unit for measuring a present position, and a movement measuring unit for measuring a relative positional change, the positioning device obtaining position data of a plurality of points on a movement route by using the positioning unit and the movement measuring unit, the method comprising:

calculating position data of the plurality of points on the movement route based on position data of a first reference point and positional change data obtained through measurement of the movement measuring unit;

obtaining difference information representing a difference between a position represented by the calculated position data and a position represented by a positioning result of the positioning unit with respect to any second reference point on the movement route; and correcting the calculated position data of at least one of the plurality of points based on the obtained difference information;

wherein the correcting comprises executing a correcting calculation containing a correcting term based on a total time length taken to move from the first reference point to the second reference point, a first time length taken to move from the first reference point to a point at which position data of a correction target is obtained, and the difference information at the second reference point;

wherein a ratio of the first time length to the total time length is set as a coefficient, a displacement amount represented by the difference information is multiplied by the coefficient, and a product of the displacement amount and the coefficient is added to the position data of the correction target; and wherein the calculating, the obtaining, and the correcting are performed by the CPU of the positioning device.

11. A non-transitory computer readable storage medium having a program stored thereon which is executable by a computer that receives measurement results from a positioning unit for measuring a present position and a movement measuring unit for measuring a relative positional change and that obtains position data of a plurality of points on a movement route, the program controlling the computer to execute functions comprising:

calculating position data of the plurality of points on the movement route based on position data of a first reference point and positional change data obtained through measurement of the movement measuring unit;

obtaining difference information representing a difference between a position represented by the calculated position data and a position represented by a positioning result of the positioning unit with respect to any second reference point on the movement route; and correcting the calculated position data of at least one of the plurality of points based on the obtained difference information;

wherein the correcting comprises executing a correcting calculation containing a correcting term based on a total time length taken to move from the first reference point to the second reference point, a first time length taken to move from the first reference point to a point at which position data of a correction target is obtained, and the difference information at the second reference point; and wherein a ratio of the first time length to the total time length is set as a coefficient, a displacement amount represented by the difference information is multiplied by the coefficient, and a product of the displacement amount and the coefficient is added to the position data of the correction target.

12. The positioning device according to claim 3, wherein the difference information contains information of a distance and a direction between two points represented by two position data.

13. The positioning device according to claim 3, further comprising a storage unit for storing movement record data containing the position data of the plurality of points calculated by the position calculating unit, wherein the correcting unit corrects the position data of the plurality of points contained in the movement record data.

14. The positioning device according to claim 3, wherein measurement of the movement measuring unit and calculation of the position data by the position calculating unit are continuously performed while measurement of the present position by the positioning unit is intermittently performed, and the correcting unit sets two points at which position data is intermittently measured by the positioning unit as the first and the second reference points, and corrects the position data calculated by the position calculating unit.

\* \* \* \* \*